April 15, 1969 R. W. GUNDLACH 3,438,772

IMAGE REPRODUCTION INVOLVING ELECTROSTATIC TRANSFER OF A RELEASABLE DONOR FILM FROM A PHOTOCONDUCTIVE INSULATING LAYER TO AN ADHESIVE TRANSFER MEMBER

Filed Dec. 2, 1964

INVENTOR.
Robert W. Gundlach

BY Anthony D. Cennamo

ATTORNEY

United States Patent Office 3,438,772

Patented Apr. 15, 1969

3,438,772

IMAGE REPRODUCTION INVOLVING ELECTROSTATIC TRANSFER OF A RELEASABLE DONOR FILM FROM A PHOTOCONDUCTIVE INSULATING LAYER TO AN ADHESIVE TRANSFER MEMBER

Robert W. Gundlach, Victor, N.Y., assignor to Xerox Corporation, Rochester, N.Y., a corporation of New York Filed Dec. 2, 1964, Ser. No. 415,310
Int. Cl. G03g 13/22
U.S. Cl. 96—1 9 Claims

ABSTRACT OF THE DISCLOSURE

A method of forming image reproductions with a releasable donor film supported overlying a photoconductor, wherein an electrical charge differential is applied to the donor film during exposure whereby the tenacity of the film to its support is increased in the areas of illumination permitting only non-illuminated areas to be stripped therefrom to an adhesive transfer member.

This invention relates to novel method and apparatus of image reproduction.

With an ever-increasing yield of information of various forms, there has arisen a concomitant need for improvements in recording and reproducing the information. Thus, many purposes exist for which it may be desired that original information be reproduced, as for example, to effect wide dissemination, to effect permanent records of otherwise passing information, to effect size reduction for storage purposes, etc. In other instances, it is desired to transpose information into more useful form. Thus, original intelligence or information which is transmitted in the form of electrical signals or the like may be impossible to comprehend unless recorded for subsequent analysis.

It has long been desired that a reproduction system be available that would accord flexibility in the ultimate reproduction form, and, at the same time, offer the versatility of controlled fidelity, wide latitudes of sensitivity and yet be compatible for either high or low speed information output systems. For example, it is frequently desirable to project otherwise received optical information as transparencies in order that the information can be better or more appreciatively utilized than when received. It is frequently a requirement or preferred that the transparencies be of high resolution. It is also sometimes a requirement that the copy be formable at a high rate of speed consistent with the output rate of the information source. When such a reproduction rate is possible, lag is prevented and a need to store incoming material is dispensed with.

It is therefore an object of the invention to provide novel method and apparatus for the recording or production of information.

It is a further object of the invention to provide novel method and apparatus for the formation of either negative and/or positive image reproductions.

It is a still further object of the invention to provide novel method and apparatus for the simultaneous formation of complementary negative and positive image reproductions.

It is a still further object of the invention to provide novel method and apparatus for forming high density, low contrast reproductions from relatively low density, low contrast original images.

It is a still further object of the invention to provide novel method and apparatus for rapid transformation of information intelligence into high resolution reproductions expediently and relatively inexpensively as compared to known methods of the prior art.

Additional objects of this invention will in part be obvious and will in part become apparent from the following specification and drawings, in which.

Figures 1, 2, 3, 4, 5, 6:
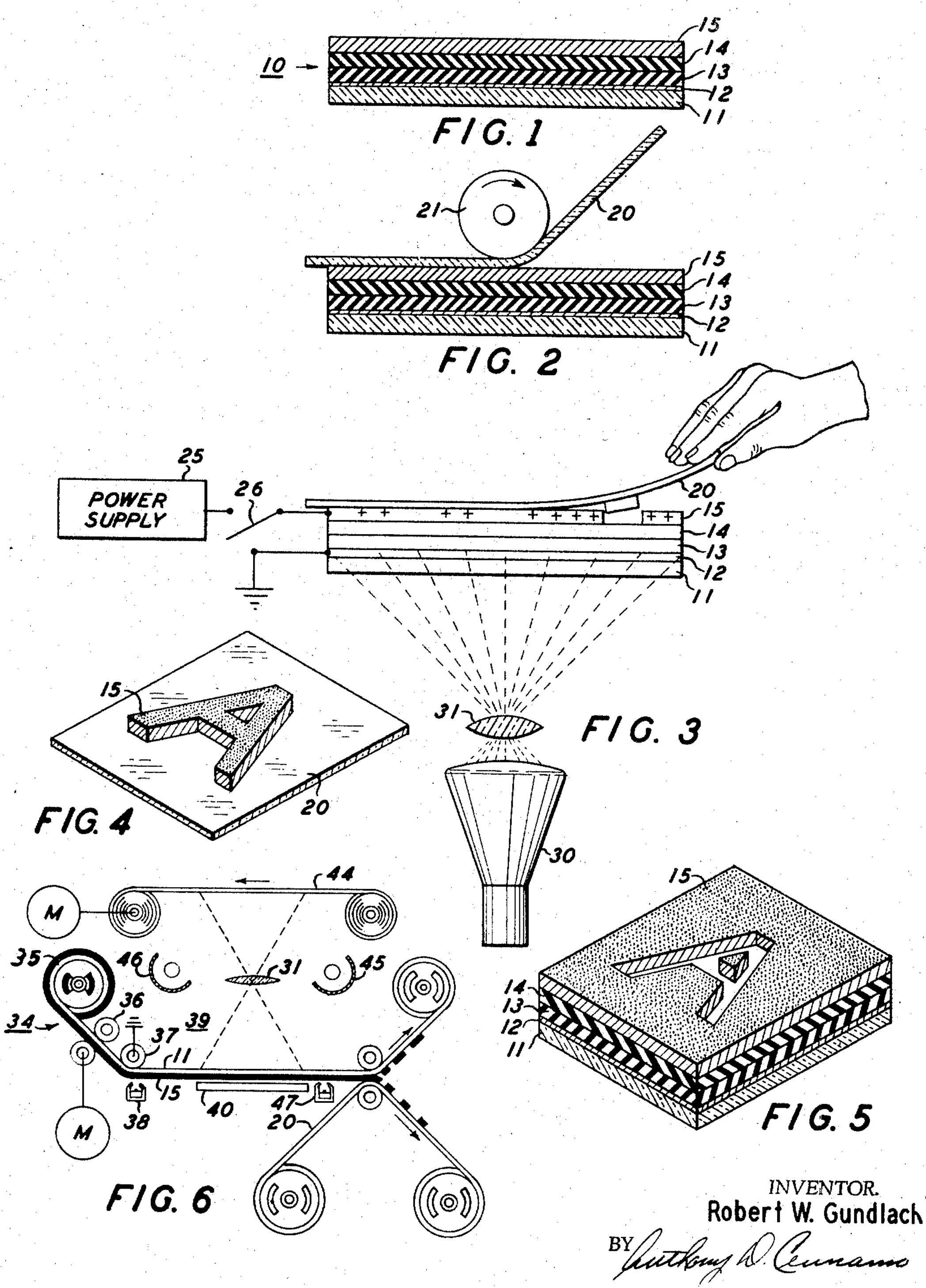
FIG. 1 is a sectional view of an image forming structure in accordance with the invention.
FIG. 2 illustrates applying an adhesive transfer member onto the surface of the imaging structure.
FIG. 3 illustrates the step of effecting image formations.
FIGS. 4 and 5 represent resulting complementary image formations.
FIG. 6 is a schematic of an automatic apparatus embodiment adapted for continuous operation.

Referring now to FIG. 1, the imaging structure in accordance with the process of the invention comprises a block member 10 consisting of a transparent substrate 11 of glass or the like having a transparent electrically conductive coating 12, as for example, tin oxide on which is supported a photoconductive layer 13 in turn supporting a thin (about 2 micron) electrically insulating layer 14 of plastic or the like to provide a charge storage interface as will be understood. Layers 11 and 12 may also comprise a single transparent conductive material such as conductive and flexible Mylar or the like as will be understood. Over the insulating layer is a thin donor film or layer 15 of opaque electrically conductive pliable material bonded relatively weakly to its support. As will be described below, layer 15 should be adequately and uniformly opaque and at the same time, desirably ought to be uniformly releasable throughout. Photoconductor 13 may be vitreous selenium, zinc oxide in a suitable binder, any of the various organic photoconductors such as phthalocyanine, polyvinyl carbazole, or 1,4 bis (diethylaminophenyl) oxadiazole as is known in the art.

Referring to FIG. 2, there is shown the application of a transfer sheet 20 in an adhesive bonded relation to the surface of the donor film. For this purpose, transfer sheet 20 may be one of the various forms of commercially available opaque or transparent adhesive tapes and is applied uniformly against the surface of layer 15 by means of a continuously advanced roller 21 of soft rubber or the like as to uniformly impress all areas thereof into uniform contact. Preferably, as shown, the tape has at least one dimension greater than the surface to be covered in order that it may be finger gripped for subsequent removal in forming the image reproduction. Where transfer sheet 20 is basically non-adhesive, a suitable mucilage or cement affording limited bonding properties, as will be described, may be initially applied to either of the surfaces to be contacted.

Either before or after the tape has been applied and bonded to film 15, the next step of the process is carried out in the manner illustrated in FIG. 3. A voltage from a power source 25 is connected via switch 26 to the conductive film 15 while the conductive substrate 12, supporting photoconductor 13, is maintained at ground potential. Simultaneously therewith, an imaging source 30, which may be a cathode ray tube or any suitable or conventional type of imaging source, emits an illuminated image by means of an objective lens 31 to be projected onto photoconductive layer 13. In the areas of illumination, as opposed to the non-illuminated areas of the photoconductor comprising image areas, there is produced a selective increase in electric field strength across layer 14, with a corresponding areawise increase in charge density in layer 15. The charge pattern thus produced results in an electrostatic force exerted selectively in those areas for attracting and maintaining the layer adhering to support with greater tenacity than before. By permitting exposure to an image of approximately 50 ft. candles seconds, then throwing switch 26 to the ground terminal and immediately stripping transfer sheet 20 away, the areas of film 15 corresponding to unilluminated image areas of the photoconductor will be removed thereto whereas the illuminated image areas remain bonded to the insulating layer 14 in image configuration. The latter is retained as a result of the attraction forces between the trapped charges brought to the insulating layer by photocurrent through the photoconductor and the induced charges in the opaque conducting layer 15. Grounding serves to reduce the electrostatic pull to zero in unexposed areas. That is, without grounding, a pull would exist in all areas differing only by the ratio of "dark" vs. "light" capacitance per unit area.

The results following stripping are shown in FIGS. 4 and 5. As can be seen, transfer sheet 20 contains on its surface a raised image formed of layer 15 in the form of letter A, as would be formed from an original dark image on a light background. At the same time, a recessed image is formed as shown in FIG. 5 of the balance adhering portions of the layer 15 corresponding to the areas of illumination of the photoconductor and constituting a reversed or complementary image of that shown in FIG. 4. Where the layer 15 is metallic, the resulting pattern following transfer can comprise an element for printed circuit work as is known in the art.

Refer now to FIG. 6 in which an automatic apparatus embodiment is shown. Materials formed as in block 10, are selected for their flexible properties and are contained as a web 34 on a supply reel 35. After being led into the bite of a pair of motor driven feed rolls 36, the web is advanced thereby about a ground roll 37 whereat surface 15 receives an electrostatic charge from corona generator 38 before advancing to an exposure station 39 over platform 40. The applied charge sensitizes photoconductor 13. At the exposure station, original copy 44 is illuminated by lamps 45 and 46 causing photocurrent to be carried in the illuminated areas of the web to the photoconductor-insulator interface.

A second corona generator 47 is arranged to apply a neutralizing charge to the free surface of layer 15 as it advances from the exposure station to reduce the remaining surface charges thereon to essentially zero. Charges in the previously illuminated areas are retained by induction. The mutual charge attraction on opposite sides of insulating layer 14 increases the bond tenacity of layer 15 in those areas of charge.

Web 34 then advances into a sandwich arrangement with a web length of adhesive transfer member 20, from a supply reel 48, through a pair of squeeze rolls 49 and then stripped apart. This forms complementary reproductions as in FIGS. 4 and 5 and which can be severed, projected, or otherwise utilized as required. It should be noted in connection with this embodiment that material comprising layer 15 should have sufficient electrical resistance to permit independent operational effects of corona generators 38 and 47.

It is essential to the operation of the invention hereof that there be effected an appropriate balance of the adhesion forces in a manner whereby the electrostatic force generated on illumination is sufficiently greater than the adhesive pull on stripping to effect retention of those corresponding portions. At the same time, in those areas wherein the electrostatic forces are non-existent or insufficiently existent, the adhesive pull on stripping should completely remove the film 15.

The properties of film or layer 15 therefore plays an important role in the instant process and should of course include appropriate properties compatible with the other materials being used. The film should be adequately and uniformly opaque throughout and at the same time desirably ought to be uniformly releasable to the adhesive employed. The internal bond should be great enough to permit complete stripping and where subject to the aforesaid electrostatic forces should bond thereto with a force greater than the transverse internal bond or strength of the film. Evaporated metal coatings of antimony, aluminum and silver have exhibited properties suitable for the purposes hereof as well as particulate dispersions. In the usual form of the invention as carried out, it was found that opaque particulate dispersions dispersed in a thin, uniform film coated onto the base performed very effectively. Electrophoretic deposition gave controlled uniform thicknesses with good adhesive retention. Ordinarily, dispersing agents such as Tannin or sulfonated oils as low as 0.1 percent by weight are useful to maintain the particles in suspension and provide adequate bond between the particles. The binder need only be sufficient to cement the material and not to provide continuity. Bonding may also be enhanced by incorporating from about 0.5 percent to about 20 percent by weight of a plastic material such as acrylics, polystyrenes, methylates, etc. Graphite and carbon blacks are ideal pigments due to their fine particle size and opacity but most other pigments will operate. Various dag suspension forms of the Acheson Colloid Company will work well. Metal powders and pigments such as iron oxide and zinc chromate as well as colloidal suspensions of magnesium and chromium will likewise work well. In a preferred embodiment, the donor film consists of a coating formed of a colloidal suspension of graphite in a solvent with a dispensing or binding agent of a type marketed commercially as dispersion No. 154 by the Acheson Colloids Company.

Thickness of film 15 is not considered critical and is largely a function of resolution to be attained. Generally, thickness ranges from about .0001 inch to produce about 70 line pairs/mm. and above and to about .0003 inch and above for 40–50 line pairs/mm. However, operable films have been prepared ranging down to 1,000 angstroms employing evaporated metal coatings and up to .001 inch thickness for particulate film for which fine results have been attained. Still thicker films on the order of 1/16 of an inch can be employed for applications in which high resolution is not a primary consideration as in the preparation of braille images and, of course, still thicker films or layers may be used. Greater thicknesses, however, require greater forces requiring much higher potentials. The conductivity of the film must be such as to maintain equipotential during exposure. In some cases it must also provide a time constant of charging comparable with exposure time.

Transfer sheet 20 may be applied in a manner shown and may comprise any of the various common tapes available from conventional commercial outlets. It may likewise comprise any other suitable form of flexible base having a tacky or tackified surface suitable for use herein. Hence, it may comprise a flexible base coated with a liquid adhesive placed in contact with the pliable layer and permitted to bond thereto prior to exposure and stripping. Where transfer sheet is transparent, the transfer of the opaque image thereto results in a projectible image transparency as is known in the photographic art. At the same time, where sheet 20 is opaque and of a contrasting color with that of the transferred film 15 image, a useful image suitable for viewing by reflection likewise results following transfer.

The bond effected therefor by the adhesive stripping must of necessity be such as to accord a weaker attractive force on stripping than that produced by the combination of electrostatic forces of illumination and the natural bond of the film to its support. It must also be greater than the natural bond alone of the film to its support. With a 500 volt potential applied in the manner described and assuming thicknesses of the photoconductor and insulating layers of 10 and 2 microns respectively, the required adhesive force should be on the order of 8 atmospheres or about 120 pounds per square inch (p.s.i.). With lower or greater voltages applied, this bond correspondingly changes nearly and approximately proportional. To assure maintainence of resolution when the image is transferred, a "hard" adhesive is preferred with a "low quick tack." Such a material is a pressure sensitive adhesive with a high creep resistance and about a three-pound peel strength per inch of width as measured when being removed from polished stainless steel at 72° F. employing a 180° peel angle at the rate of about four feet per minute. This class of adhesiveness is not intended herein as a definition of operability limits or as defining criticality, but is included for disclosure purposes only. Operability in a practical sense is a function of the image resolution desired and resolution as is now apparent will depend on many factors. Materials suitable for use herein include cellophane tapes, masking tapes, household adhesive tapes including friction tapes, supports coated with a tacky layer such as rubber cement, household mucilage and the like. A preferred tape is a brand 853 Mylar tape marketed by the Minnesota Mining and Manufacturing Company.

By the above description there is disclosed a novel process of image formation by which high resolution complementary images are formed in response to a radiation input from an original source. By a proper choice of materials, extremely high resolution images can be obtained. In addition, donor films such as the particulate dispersion described above are characterized by clean, sharp breaks giving sharp edges and corners. The abrupt transition, as compared to prior art techniques in which a transition has associated bleeding between colors results in extremely high definition. With this control over resolution as well as high definition, it has been found possible to produce high quality half tone reproductions. It should also be apparent that the process lends itself not only to forming black and white image transparencies, but also to multicolor transparencies as well as to reproduction of other than transparencies.

It is not intended that the size of the formed reproductions be in any way limited to contact size by the structure shown. Rather, the ultimate size can be a function of the requirements for the application and may include magnification changes on exposure between the original and final reproduction producing microimages or extreme enlargements. It is further not intended to be limited to any named materials since any suitable material combinations according to the results to be obtained in accordance with the description of the invention are intended to be encompassed herein. Whereas high resolution reproduction has been distinctly emphasized as an advantage of the instant invention, it should be apparent that the scope of the invention is much broader and diverse. At the same time, whereas the process has been generally described in terms of manual manipulations in the removal and stripping of the transfer member, it should be apparent to those skilled in the art that the steps hereof are readily and easily converted to automatic motively powered installations.

Since many changes can be made in the above construction and many apparently widely different embodiments of this invention could be made without departing from the scope thereof, it is intended that all matter contained in the drawings shall be interpreted as illustrative and not in a limiting sense.

What is claimed is:

1. The process of forming an image reproduction comprising the steps of:

supporting an adhesive transfer member in contact with a surface film adhering to a support surface capable of retaining an electrical charge, said surface film being releasable from said support surface to said transfer member in response to an electrical charge pattern on said support surface, forming an added electrostatic attractive force in image configuration between said releasable film and its support whereby in the image congfuration areas having an added electrostatic attractive force the bond of said film to its support is greater than the net adhesive bond of said film to said transfer member, and stripping said transfer member from said releasable film whereby the area portions of said film subjected to said added electrostatic force remain on said support and the complementary areas thereof are adhesively stripped to said transfer member.

2. The process according to claim 1 in which the releasable surface film on said support comprises a metallic film.

3. The process according to claim 1 in which the releasable surface film on said support comprises a colloidal suspension of material in a solvent.

4. The process according to claim 1 in which said transfer member is transparent and said releasable film is opaque.

5. The process of forming an image reproduction comprising the steps of:

supporting an adhesive transfer member in contact with an electrically conductive surface film adhering to an insulating support surface overlying a photoconductive layer on a transparent electrically conductive substrate, said electrically conductive surface film being releasable from said support surface to said transfer member in response to an electrical charge pattern on said photoconductive surface, exposing the conductive substrate to an illumination image pattern of an original while a difference in potential is maintained between said film and said substrate whereby in the illumination areas the bond of said film to its support is greater than the net bond of said film to said adhesive, and stripping said transfer member from said releasable film whereby the area potrions of said film subjected to said increased bond remain on said support and the complementary areas thereof are adhesively stripped to said transfer member.

6. The process according to claim 5 in which said transfer member comprises an adhesive tape applied against said releasable surface film.

7. The process according to claim 5 including electrically grounding said film and substrate layers concomitantly with said stripping step.

8. The process according to claim 5 in which said releasable film is charged prior to exposure.

9. The process according to claim 8 in which after exposure and prior to stripping remaining surface charges on said releasable film are substantially neutralized by application of a second charge.

References Cited

UNITED STATES PATENTS

| | | | |
|---|---|---|---|
| 2,949,848 | 8/1960 | Mott | 101—128.3 |
| 3,166,418 | 1/1965 | Gundlach | 96—1 |
| 3,166,420 | 1/1965 | Clark | 96—1 |

NORMAN G. TORCHIN, *Primary Examiner.*

J. C. COOPER, *Assistant Examiner.*

U.S. Cl. X.R.

96—1.5, 1.3